United States Patent [19]
Downing

[11] 4,406,912
[45] Sep. 27, 1983

[54] LIFT-OFF ELEMENT

[75] Inventor: Gerald T. Downing, Port Washington, Wis.

[73] Assignee: W. H. Brady Co., Milwaukee, Wis.

[21] Appl. No.: 338,395

[22] Filed: Jan. 11, 1982

Related U.S. Application Data

[63] Continuation of Ser. No. 166,984, Jul. 8, 1980, abandoned.

[51] Int. Cl.³ .................. B41J 31/05; B32B 27/34
[52] U.S. Cl. ............................. 428/352; 400/696;
428/343; 428/355; 428/475.2; 428/906

[58] Field of Search ............ 428/352, 343, 355, 906,
428/475.2; 400/696

[56] References Cited

U.S. PATENT DOCUMENTS 4,093,772  6/1978  Taylor .................. 428/339
4,166,706  9/1979  Korpman ............... 428/355
4,242,402  12/1980 Korpman ............... 428/355

Primary Examiner—Ellis P. Robinson

[57] ABSTRACT

A pressure-activated lift-off element in which a lift-off layer comprises a combination of at least one solid polyamide adhesive resin and oleic acid.

6 Claims, 2 Drawing Figures

LIFT-OFF ELEMENT

This is a continuation of application Ser. No. 166,984, filed July 8, 1980, now abandoned.

FIELD OF THE INVENTION

This invention relates to lift-off elements, particularly tapes, for use in the correction of typed errors.

BACKGROUND OF THE INVENTION

Several methods are known for the correction of typed errors. One such method is disclosed in Taylor et al. U.S. Pat. No. 4,093,772, the principal object of which was to provide a tack-free lift-off tape which, because of the inherent nature of the coating, eliminated the tape's sticking to a ribbon, cardholder, paper or to itself when folded over. To accomplish this Taylor provided the tape base layer with a non-tacky coating composed of an amide type wax, resins, and plasticizers in a suitable solvent combination.

SUMMARY OF THE INVENTION

I have discovered that providing on a base layer a coating comprising a solid polyamide adhesive resin and oleic acid provides a highly useful lift-off element of the type free from problems of sticking to itself and other things.

In preferred embodiments both a binder polyamide adhesive resin and a wetting-softening polyamide adhesive resin are used; the oleic acid is Oleic Acid No. 38 (Milwaukee Solvents & Chemicals Corp.); and there is included a small amount of a rosin-derived tackifying resin.

PREFERRED EMBODIMENT

I turn now to a description of the drawings and the structure and operation of a preferred embodiment.

DRAWINGS

Structure

Figure 1:
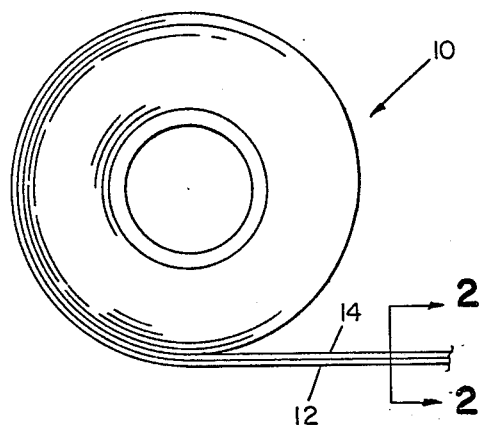
FIG. 1 is a view of a self-wound, partially unwound roll of lift-off tape.
Figure 2:
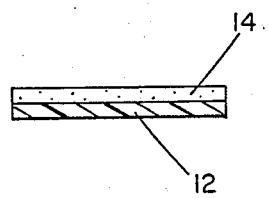
FIG. 2 is a cross-sectional view taken at 2—2 of FIG. 1.

There is shown in the drawings a self-wound roll of lift-off tape 10 comprising polyester backing layer 12 and lift-off layer 14.

The lift-off layer 14 has the following composition:

| Component | % By Weight (Solid) | Parts |
|---|---|---|
| Emerez 1566 | 44.4 | 40 |
| Emerez 1557A | 22.2 | 20 |
| Oleic Acid #38 | 22.2 | 20 |
| Foral 85 | 11.2 | 10 |
| Total | 100.0 | 90 |

It was desposited using ordinary solvent application techniques from the following coating solution:

| Component | % By Weight (Coating Solution) |
|---|---|
| Emerez 1566 | 17.8 |
| Emerez 1557A | 8.9 |
| Oleic Acid No. 38 | 8.9 |
| Foral 85 | 4.5 |
| n-Butyl Alcohol | 32.1 |
| Toluene | 10.8 |
| 1,1,1, Trichloroethane | 10.8 |
| Water | 6.2 |
| Total | 100.0 |

Emerez 1566 (Emery Industries, Inc.) is the binder solid polyamide adhesive resin in the combination. It is characterized by a softening point of about 165°–170° C., viscosity of 60–90, poise at 190° C., a 300% elongation at break, an amine value max of 1.0, and an acid value max of 12.0. The binder polyamide adhesive resin serves to bind together all the components, helps to provide resistance to creep under roll pressure, and causes the layer to remain non-tacky without exuding oleic acid at levels of the latter giving desirable lift-off results.

Oleic acid No. 38 is a commercial distillate of saturated and unsaturated fatty acids, approximately as follows:

| | % |
|---|---|
| Myristic C-14 | 3.0 |
| Palmitic C-16 | 5.0 |
| Stearic C-18 | Trace |
| Myristoleic C-14 | 3.0 |
| Palmitoleic C-16 | 6.0 |
| Oleic C-18 | 73.0 |
| Linoleic C-18 | 9.0 |
| | 100.0 |

This material has the following properties: Iodine Value, 89–93; Acid Value, 199–205; and Sap Value, 199–204. The oleic acid greatly enhances lift-off properties of the invention.

The wetting-softening polyamide adhesive resin Emerez 1557A (Emery Industries, Inc.) is a high-amine value material with a softening point of 145° C., viscosity of 5, poise at 90° C., and a 250% elongation at break, an Amine value max between 55 and 70, and an Acid value max of 2.0. Not only does it contribute to desirable wetting and softening characteristics of the combination, but it enhances adhesion of the lift-off layer to the polyester tape backing and improves lift-off properties.

The rosin-derived tackifying resin is Foral 85 (Hercules Incorporated), a glycerol ester of hydrogenated rosin having a softening point of 82° C., an Acid No. of 9, and good solubility in Toluene. This material's contribution to the formulation is to promote adhesion of the lift-off layer to the polyester tape backing.

The ingredients maintain a solution in the solvent system specified for a practical length of time, although there is a tendency to be formed a reversible gel, undesirable for use in coating, upon undue standing.

The backing layer 12 has a thickness of 0.00150 inch. The thickness of the lift-off layer 14 is 0.001 inch. There is on the side of base 12 opposed to layer 14 a release coating (W. H. Brady release coating #3608).

Operation

The tape may be used in the way well-known for use of lift-off tapes in which the lift-off layer is free from any bothersome tendency to stick to things. A roll according to the invention has high lift-off ability, good freedom from sticking, good adhesion to the support tape, and good roll integrity.

OTHER EMBODIMENTS

The ingredients may be varied within the following ranges:

| | |
|---|---|
| Binding resin | 35–45 |
| Oleic acid | 18–25 |
| Wetting-softening resin | 15–25 |
| Tackifying resin | 5–15 |

Too much binding resin detracts from adhesion to tape backing and lift-off; too little causes coating creeping with time and temperature. Too little oleic acid degrades lift-off properties; too much results in oleic acid exuding and coating creep under temperature and pressure. Too little rosin-derived tackifying resin results in poor adhesion to the backing layer; too much causes exudation of oleic acid and rosin-based tackifier.

The invention may also be used in hot-melt depositions.

What is claimed is:

1. A lift-off element comprising a backing layer and a lift-off layer, said lift-off layer comprising a binder polyamide adhesive resin having a softening point at a first temperature and oleic acid.

2. The element of claim 1 which includes also a second, wetting-softening polyamide adhesive resin with a softening point at a second temperature, said second temperature being less than said first temperature.

3. The element of claim 2 in which said lift-off layer includes also a tackifying resin.

4. The element of claim 3 in which said tackifying resin is rosin-derived.

5. The element of claim 3 in which said binding resin is present in the amount of a range of 35–45, said oleic acid is present in the amount of a range of 18–25, said wetting-softening resin is present in the amount of a range of 15–25, and said tackifying resin is present in the amount of a range of 5–15.

6. The element of claim 5 in which said element is a roll and said support layer has on an opposed side thereof a layer of release coating.

* * * * *